United States Patent
Li et al.

(10) Patent No.: US 10,764,073 B2
(45) Date of Patent: Sep. 1, 2020

(54) CONTROLLING COMMUNICATIONS

(71) Applicant: NOKIA SOLUTIONS AND NETWORKS OY, Espoo (FI)

(72) Inventors: Xiang Yang Li, Beijing (CN); Daniel Saker, La Ville du Bois (FR)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 16/256,612

(22) Filed: Jan. 24, 2019

(65) Prior Publication Data
US 2019/0229935 A1      Jul. 25, 2019

(30) Foreign Application Priority Data
Jan. 24, 2018  (FI) ...................................... 20185065

(51) Int. Cl.
*H04L 12/14*  (2006.01)
*H04L 12/28*  (2006.01)
(Continued)

(52) U.S. Cl.
CPC ...... *H04L 12/1407* (2013.01); *H04L 12/1453* (2013.01); *H04L 12/1464* (2013.01);
(Continued)

(58) Field of Classification Search
CPC .. H04M 7/006; H04L 29/06027; H04L 12/66; H04L 29/06421; H04Q 11/04
(Continued)

(56) References Cited

U.S. PATENT DOCUMENTS

2012/0099715 A1    4/2012  Ravishankar et al.
2013/0231080 A1*   9/2013  Cheuk ................. H04M 15/765
                                                                455/405
(Continued)

FOREIGN PATENT DOCUMENTS

CN    102934420 A    2/2013
CN    103179545 A    6/2013
(Continued)

OTHER PUBLICATIONS

"3rd Generation Partnership Project; Technical Specification Group Services and System Aspect; Procedures for the 5G System; Stage 2 (Release 15)", 3GPP Standard; Technical Specification; 3GPP TS 23.502, 3rd Generation Partnership Project (3GPP), Mobile Competence Centre; 650, Routes Des Lucioles; F-06921 Sophia-Antipolis Cedex; France, vol. SA WG2, No. V1.3.0, Nov. 14, 2017, pp. 1-217.

(Continued)

*Primary Examiner* — Peter G Solinsky
*Assistant Examiner* — Sanjay K Dewan
(74) *Attorney, Agent, or Firm* — Squire Patton Boggs (US) LLP

(57) ABSTRACT

Apparatuses and methods for controlling communication of a user terminal in a communication system are provided. The solution comprises determining that a data connection of an access point name or data network name of the user terminal does not fulfil a predetermined condition, and transmitting to a network unit maintaining information on subscriber information of users of the network a message on the basis of determination, the message indicating the access point name or data network name of the user terminal is to be deactivated or the data connection of the access point name or data network name is to be directed to a predetermined server.

18 Claims, 11 Drawing Sheets

(51) Int. Cl.
  *H04W 8/20*    (2009.01)
  *H04W 76/30*   (2018.01)
  *H04M 15/00*   (2006.01)
  *H04M 15/02*   (2006.01)
  *H04W 4/24*    (2018.01)
  *H04M 17/02*   (2006.01)
  *H04M 17/00*   (2006.01)

(52) U.S. Cl.
  CPC ........ *H04L 12/2876* (2013.01); *H04M 15/66* (2013.01); *H04M 15/88* (2013.01); *H04M 15/882* (2013.01); *H04M 15/888* (2013.01); *H04M 17/02* (2013.01); *H04M 17/20* (2013.01); *H04M 17/202* (2013.01); *H04W 4/24* (2013.01); *H04W 8/20* (2013.01); *H04W 76/30* (2018.02)

(58) Field of Classification Search
  USPC .......................................................... 370/259
  See application file for complete search history.

(56) References Cited

U.S. PATENT DOCUMENTS

2013/0279521 A1  10/2013  Perez Martinez et al.
2015/0358898 A1  12/2015  Lair et al.

FOREIGN PATENT DOCUMENTS

| CN | 107534563 A | 1/2018 | |
| EP | 2 924 917 A1 * | 12/2012 | ............. H04L 12/14 |
| EP | 2658236 A1 | 10/2013 | |
| EP | 2 924 917 A1 | 9/2015 | |
| EP | 3 185 477 A1 | 6/2017 | |
| WO | 2016145177 A1 | 9/2016 | |
| WO | WO 2017/149615 A1 | 9/2017 | |

OTHER PUBLICATIONS

Jul. 1, 2019 Search Report issued in European Patent Application No. 19153636.6.
Office Action dated Oct. 25, 2018 corresponding to Finnish Patent Application No. 20185065.
3GPP TS 23.203 V15.1.0 (Dec. 2017), Technical Specification, 3rd Generation Partnership Project; Technical Specification Group Services and System Aspects; Policy and charging control architecture (Release 15), Dec. 22, 2017.
3GPP TR 32.899 V15.0.0 (Jan. 2018), Technical Report, 3rd Generation Partnership Project; Technical Specification Group Services and System Aspects; Telecommunication management; Charging management; Study on charging aspects of 5G system architecture phase 1 (Release 15), Jan. 4, 2018.
Chinese Office Action issued in corresponding Chinese Patent Application No. 2019100969959 dated Apr. 9, 2020.

* cited by examiner

CONTROLLING COMMUNICATIONS

BACKGROUND

Field

The exemplary and non-limiting embodiments of the invention relate generally to wireless communication systems. Embodiments of the invention relate especially to apparatuses, methods, and computer program products in communication networks.

Description of the Related Art

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Modern telecommunication systems such as universal mobile telecommunications system (UMTS) radio access network (UTRAN or E-UTRAN), long term evolution (LTE, known also as E-UTRA), long term evolution advanced (LTE-A), and fifth generation cellular network, 5G, comprise a charging architecture which is used for charging of different services.

Policy and online charging control (PCC) system in mobile telecommunication network provides a real-time credit and usage control capability to monitor subscriber network resource usage based on end user's balance or the data amount allowed for the end user's account. When the end user has consumed up the data allowance (such as 5 Gb data traffic per month, for example), the system will provide a mechanism to redirect the network traffic to a web portal (such as landing pager server, or customer self-care) to request end user to purchase additional data bundle to continue the network service, otherwise, the data connection shall be disconnected or throttled.

If the end user does not take immediately action to recharge balance or purchase data allowance to extend data connection, some applications on the terminals of the user may still retry to re-establish data connection to the network. However, as the end user has no data allowance, PCC again performs traffic redirection or rejection. So after the data allowance is used up, user terminal may ceaselessly re-try to establish data connection and generate a large amount of data traffic and consume much network resources.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided a method of claim 1.

According to an aspect of the present invention, there is provided an apparatus of claim 10.

BRIEF DESCRIPTION OF THE DRAWINGS

Embodiments of the present invention are described below, by way of example only, with reference to the accompanying drawings, in which.

DETAILED DESCRIPTION

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Some embodiments of the present invention are applicable to a network element of a communication system, a distributed realisation of a network element, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN), HSPA (High Speed Packet Access), long term evolution (LTE®, known also as evolved UMTS Terrestrial Radio Access Network E-UTRAN), long term evolution advanced (LTE-A), fifth generation cellular network, 5G or New radio, NR and IEEE 802.11 based wireless local area network (WLAN). For example, 5G/NR, LTE® and LTE-A are developed by the Third Generation Partnership Project 3GPP. IEEE stands for Institute of Electrical and Electronics Engineers.

Figure 1:
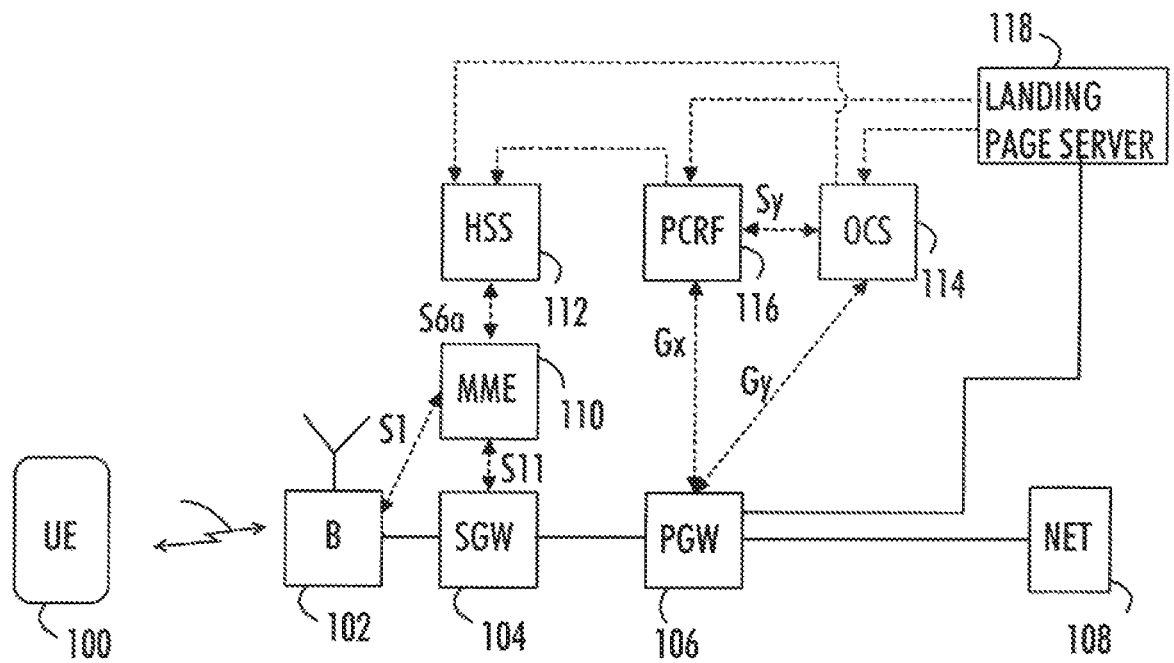
FIGS. 1 and 2 illustrate examples of communication environments where some embodiments of the invention may be applied.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 comprises a user terminal 100. The user terminal may comprise Universal Subscriber Identity Module (USIM) or Subscriber Identity Module (SIM). USIM/SIM is an application which may be stored on a card inserted to the user terminal or on a chip embedded in the terminal and which comprises information on subscriber identity, authentication, accounting and security. USIM/SIM data is used for accessing services provided by communication systems. The user terminal may be a computer (PC), a laptop, a handheld computer, a mobile phone, a smart phone or any other user terminal or user equipment capable of communicating with the cellular communication network.

Typically modern user terminals comprise applications, i.e. programs run by the processor or control circuitry of the user terminal and the applications typically communicate with a server in the network.

The user terminal is connected to a base station or eNodeB 102 and to a Serving Gateway, SGW 104 and a Mobility Management Entity, MME 110. The SGW 104 is connected to a Packet Data Network Gateway, PGW 106, which provides a connection to Internet 108.

The eNodeBs (Enhanced node Bs) of a communication system may host the functions for Radio Resource Management: Radio Bearer Control, Radio Admission Control, Connection Mobility Control, Dynamic Resource Allocation (scheduling). The eNodeB may provide radio coverage to a cell. The cell may be a macrocell, a microcell, or any other type of cell where radio coverage is present. Further, the cell may be of any size or form, depending on the antenna system utilized. The MME (Mobility Management Entity) is responsible for the overall user terminal control in mobility, session/call and state management with assistance of the eNodeBs through which the user terminals connect to the network. The SGW 104 and PGW 106 are entities configured to act as a gateway between the network and other parts of communication network such as the Internet for example.

The network may further comprise a Home Subscriber Server, HSS, which maintains information on subscriber profiles of users of the network. In an embodiment, a subscriber may have several Access Point Names, APNs. Each APN may identify one data connection capability of the user terminal. It may be noted that in 5G the corresponding term to Access Point Name is Data Network Name, DNN.

The network may further comprise an Online Charging System, OCS 114, and Policy Charging Control Function, PCRF 116, which are responsible for collecting charging information for traffic or using network resources concurrently when resources are used. OCS is also responsible for providing authorization for the use of network resources before the resources are used.

Figure 2:
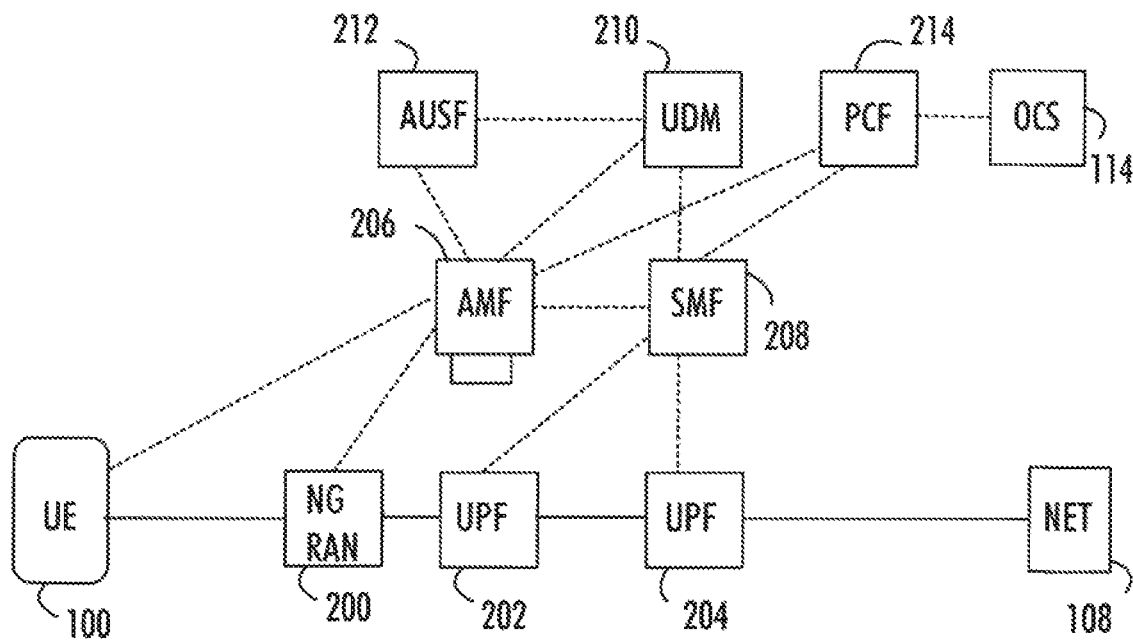

FIG. 2 illustrates another simplified view of a communication environment only showing some elements and functional entities, all being logical units whose implementation may differ from what is shown. The connections shown in FIG. 2 are logical connections; the actual physical connections may be different. It is apparent to a person skilled in the art that the systems also comprise other functions and structures.

In the example of FIG. 2, a radio system based on 5G or New Radio, NR, network elements is shown.

The simplified example of a network of FIG. 2 comprises a user terminal 100, which may be similar as in connection with FIG. 1.

The user terminal is connected to a radio access network, NG RAN 200, of the network which provides the user terminal a connection to Internet 108 via one or more User Plane Functions 202, 204. The user terminal is further connected to Core Access and Mobility Management Function, AMF 206, which is the 5G version of MME in LTE. The network further comprises Session Management Function, SMF 208, which is responsible for subscriber sessions, such as session establishment, modify and release. Unified Data Management, UDM 210 maintains information on subscriber information of users of the network. Authentication Server Function, AUSF 212 is related to 5G security processes.

As with FIG. 1, the network may further comprise an Online Charging System, OCS 114, and Policy Charging Function, PCF 214, which are responsible for collecting charging information for traffic or using network resources concurrently when resources are used. OCS is also responsible for providing authorization for the use of network resources before the resources are used.

It may be noted that the radio access network may be realised using distributed computing where the functionalities of any single entity described in FIGS. 1 and 2 may be realised using more than one physical apparatus or entity. Also virtual networking may be utilised. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer.

Figure 3:
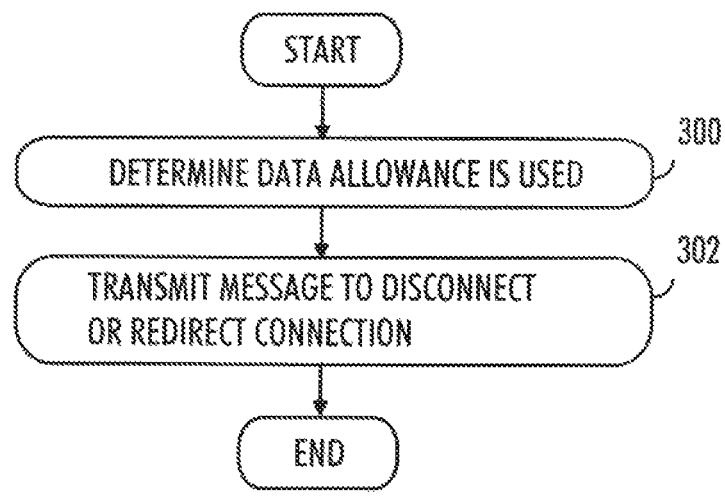
FIG. 3 is a flowchart illustrating an embodiment of the invention.

The flowchart of FIG. 3 illustrates an embodiment of a method for controlling communication of a user terminal. The steps may be executed by the OCS 114 of FIG. 1 or FIG. 2 or by another corresponding network entity or more than one entity in co-operation.

In step 300, it is determined that a data connection of an access point name of the user terminal does not fulfil a predetermined condition. In an embodiment, the access point name of the user terminal has used up the data allowance. There may also be other reasons for rejecting the data connection. For example, the end user's account life cycle state may be set to block or suspend, the end user is barred to a data service or web site or the balance is used up.

In an embodiment, the OCS 114 may receive an allocation request from a Packet Data Network Gateway, PGW. As a response to the allocation request the predetermined condition may be evaluated.

In step 302, a message is transmitted on the basis of determination, the message indicating the access point name or data network name of the user terminal is to be deactivated or the data connection of the access point name is to be directed to a predetermined server.

In an embodiment, the OCS 113 transmits the message indicating the access point name of the user terminal is to be deactivated to a network unit maintaining information on subscriber information of users of the network. In case of radio system based on LTE/SAE the network unit is the HSS 112. In case of 5G, the message may be sent to UDM 210. The HSS or UDM may be configured to update the subscription profile of the Access Point Name or Data Network Name of the user terminal to deactivate APN/DNN. Other APNs or DNNs of the user terminal may be retained as they may have separate or independent data allowances. Also, if there are data allowance free Access Point Names or Data Network Names, they will not be deactivated. Thus, the user terminal may still execute an emergency call or connection, if need be.

The HSS or UDM will further request to update MME 110 or AMF 206 so that the network traffic to the deactivated APN/DNN will be barred by MME/AMF. Thus, the user terminal will no longer be able to establish a Packet Data Network data connection and further message requests to policy and charging control system after data allowance is used up will not be sent and network resources will be saved.

In an embodiment, the OCS 113 transmits, on the basis of determination, a command to the PGW to disconnect the data connection. Thus, if the data allowance ends during an ongoing data connection, the connection may be terminated.

In an embodiment, when an APN/DNN is deactivated, the policy and charging control system will send a message to notify the customer that the data service is deactivated, and need to have further recharge to re-activate the data connection.

When the end user of the user terminal has recharged so that there is again data allowance available (or the predetermined condition is fulfilled), the policy and charging system may trigger a request to HSS or UDM re-activate APN/DNN which was deactivated previously. The HSS or UDM will update MME or AMF to remove the barring of the data connection.

In an embodiment, instead directly deactivating the APN of the user terminal, the PCRF and OCS may support the option to perform a redirection of the traffic of the APN to a self-care web portal. The web portal may inform the user of the need to recharge the data allowance balance when the balance or spending limit is used up. In an embodiment, the message indicating the data connection of the access point name of the user terminal is to be directed to a predetermined server is transmitted to the Packet Data Network Gateway, PGW.

When the end user of the user terminal has recharged, the OCS receives information that the predetermined condition is fulfilled and transmits a message to the PGW indicating that the re-direction of the data connection of the access point name of the user terminal to the predetermined server may be released.

Currently, when there is traffic request from a user terminal, the policy and charging request is always sent to PCRF or OCS for policy and charging decision. If there is no data allowance, the policy and charging control server will reject the data connection.

Embodiments of the invention provide a solution to avoid massive traffic triggered by the user terminal to re-try network for data connection re-establishment after the data allowance is used up.

With the proposed solution, the policy and charging solution architecture is able to deactivate or re-activate the general data connection APN/DNN access to avoid useless data connection establishment requests from a user terminal when there is no data allowance in OCS for data access.

Figure 4:
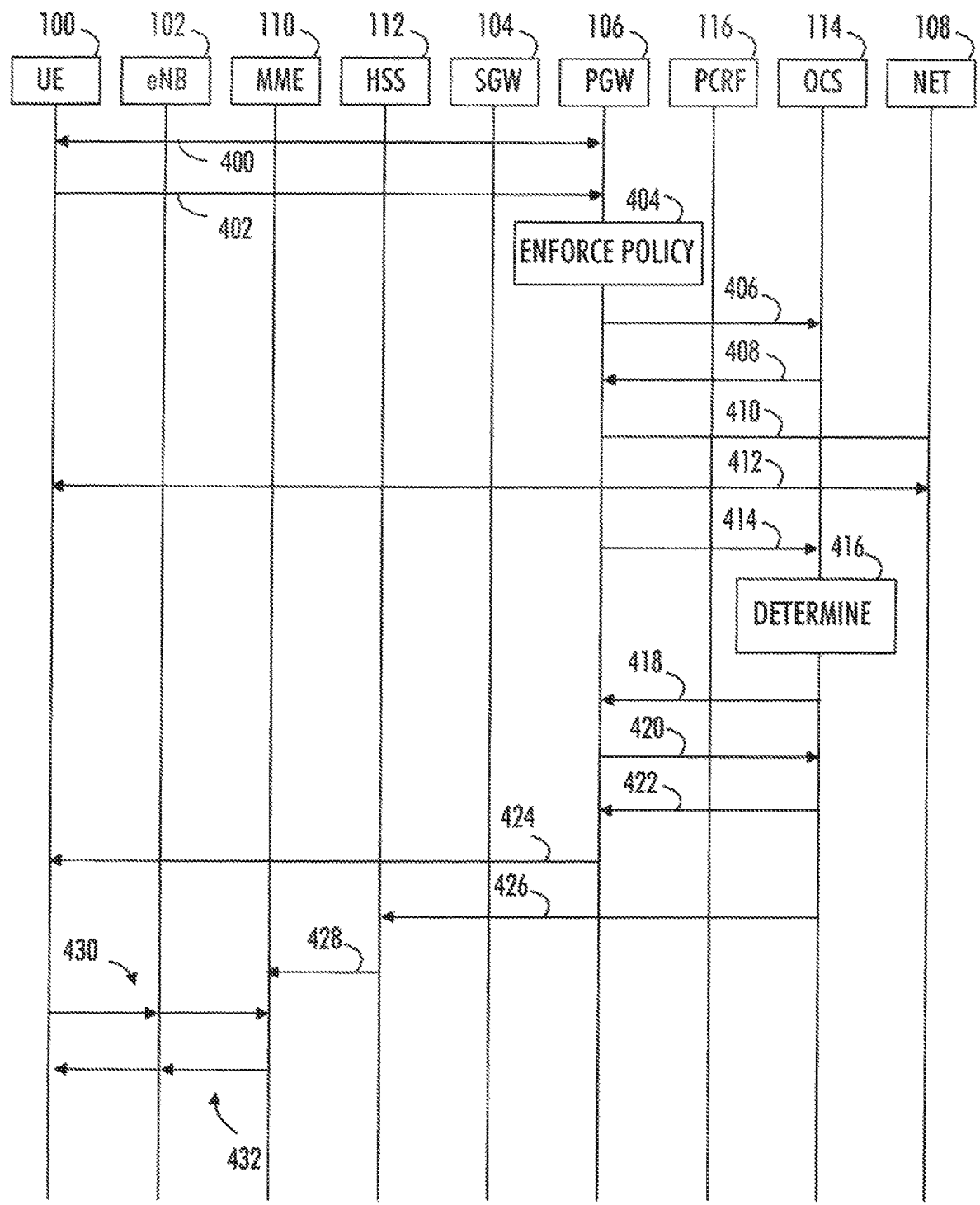
FIGS. 4, 5, 6A, 6B, 6C, 6D, 7A, 7B, 8A and 8B are signalling charts illustrating some embodiments.

FIG. 4 is a signalling chart illustrating an embodiment. The chart illustrates signalling flow when a data connection of a user terminal is deactivated when a predetermined condition fulfils. The communication system in this example is a 3G or 4G based system.

When the situation begins a data connection 400 between a user terminal 100 and PGW 106 has been established. Next the user terminal 100 initiates 402 a data connection to a server in the Internet 108. PGW enforces 404 policy rules related to the user terminal, i.e. determines if the connection is allowed.

After PGW has consume up the data quota allocated during PDN session establishment, the PGW transmits 406 a Credit Control Request "Update" (or CCR-U, or CCR-Update) to the OCS 114 to request quota (such as to request X Mbytes of traffic).

The OCS grants quota and transmits 408 a Credit Control Answer CCA "Update" (or CCA-U, or CCA-Update) as a reply to the PGW.

As a result, PGW forwards 410 the traffic data request of the user terminal to Packet Data Network or Internet 108.

The data connection 412 between the user terminal and Internet has been established.

At some point of time, PGW transmits 414 another CCR-U to the OCS 114 to request more quota for the connection.

The OCS determines 416 that the balance of the Access Point Name of the user terminal is used up or the data spending limit is reached and rejects to allocate quota.

The OCS returns 418 a failed result code in a CCA-U message to the PGW.

As a result the PGW transmits 420 a CCR "Terminate" (or CCA-T or CCA-Terminate) to terminate the data connection.

The OCS transmits 422 a CCA "Terminate" (or CCA-T or CCA-Terminate) to acknowledge that OCS received the CCR-T.

Next the PGW informs 424 the user terminal that the data connection is rejected.

The OCS transmits 426 a request to HSS to deactivate the Access Point Name of the user terminal 100 because the balance of the Access Point Name of the user terminal is used up or the data spending limit is reached.

The HSS updates 428 the MME on the basis of the request to set the APN status as deactivated.

If the user terminal tries to establish 430 a data connection using the APN, the MME rejects 432 the connection as the APN status is deactivated.

Figure 5:
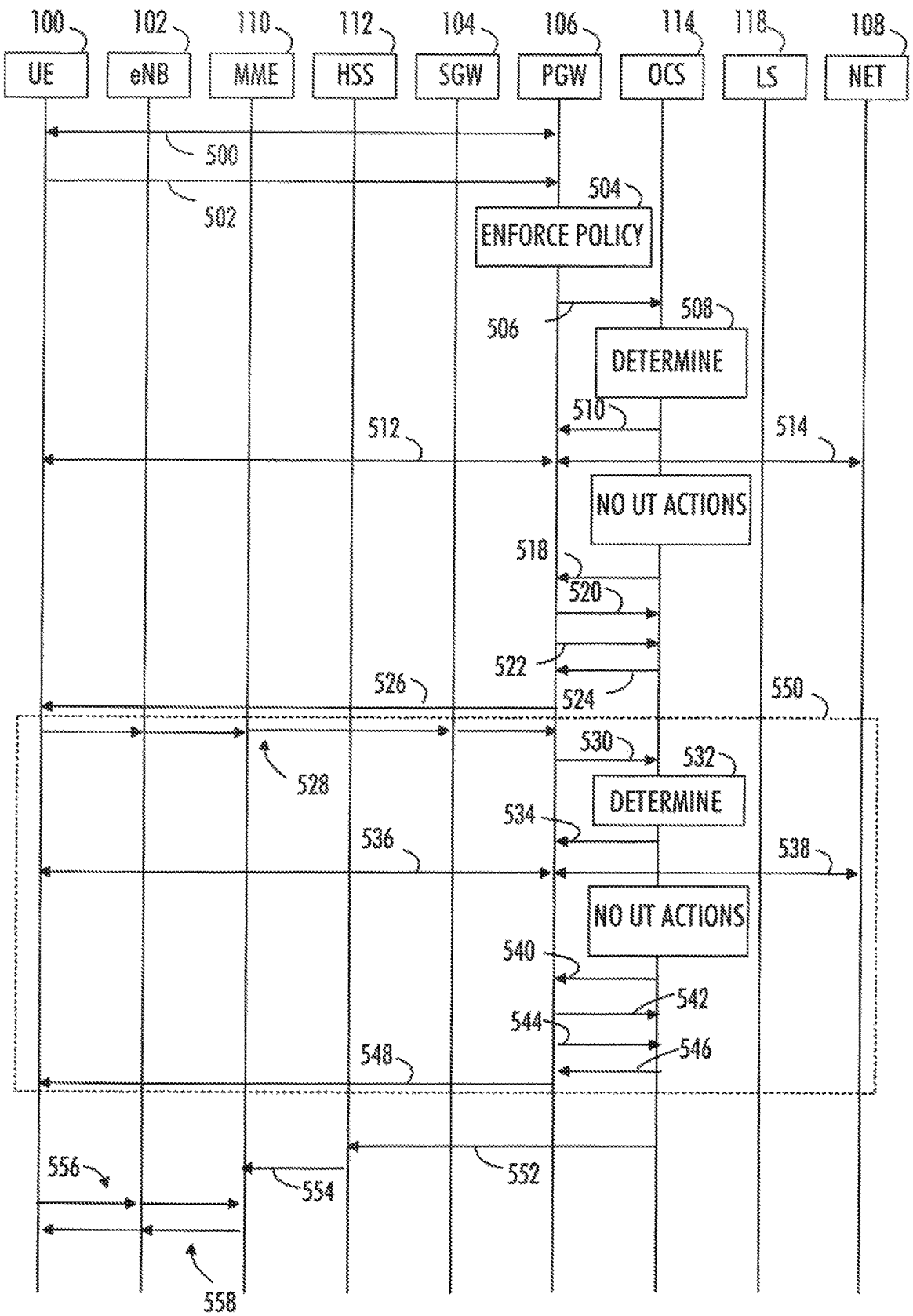
Figure 6A:
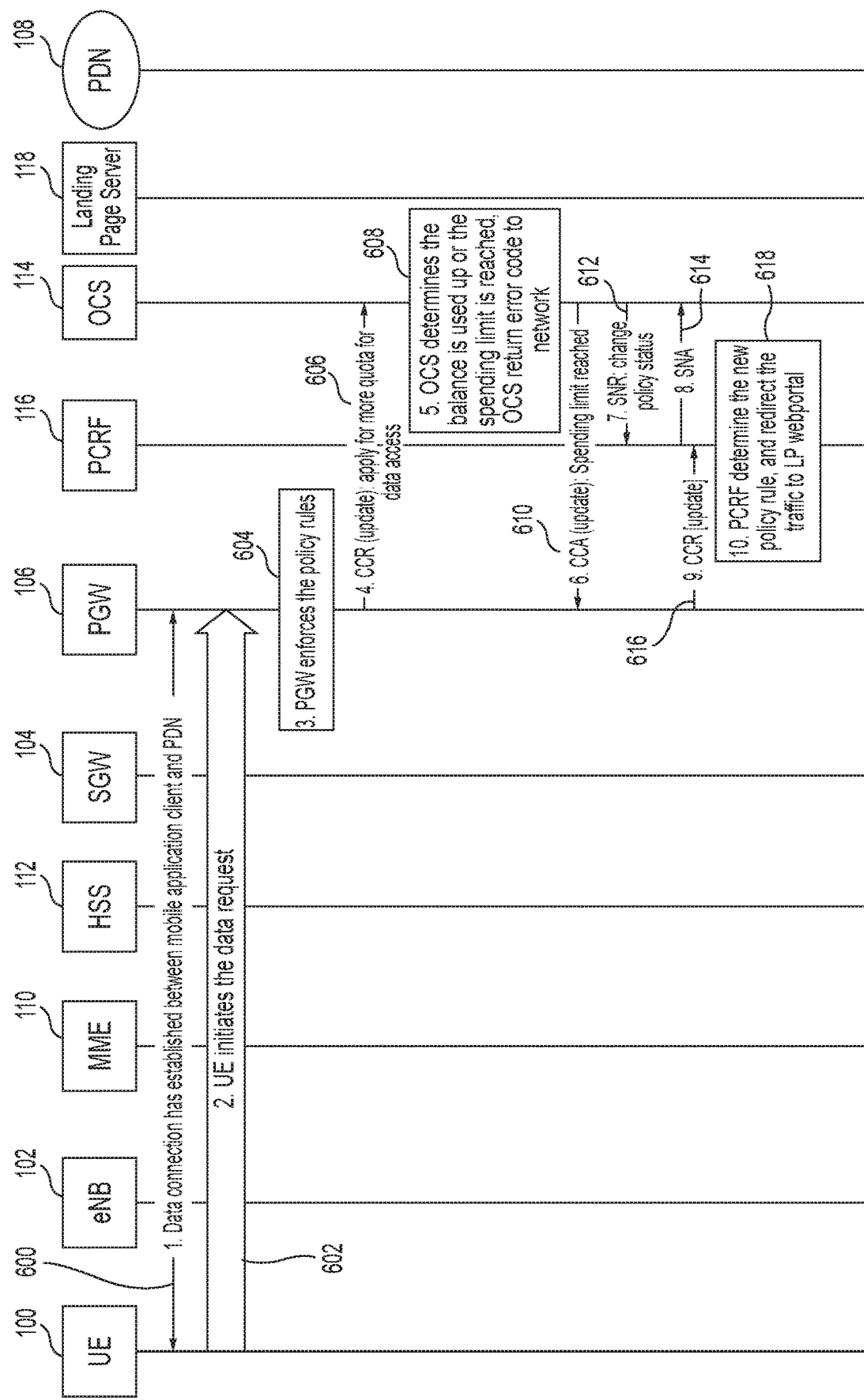
Figure 6B:
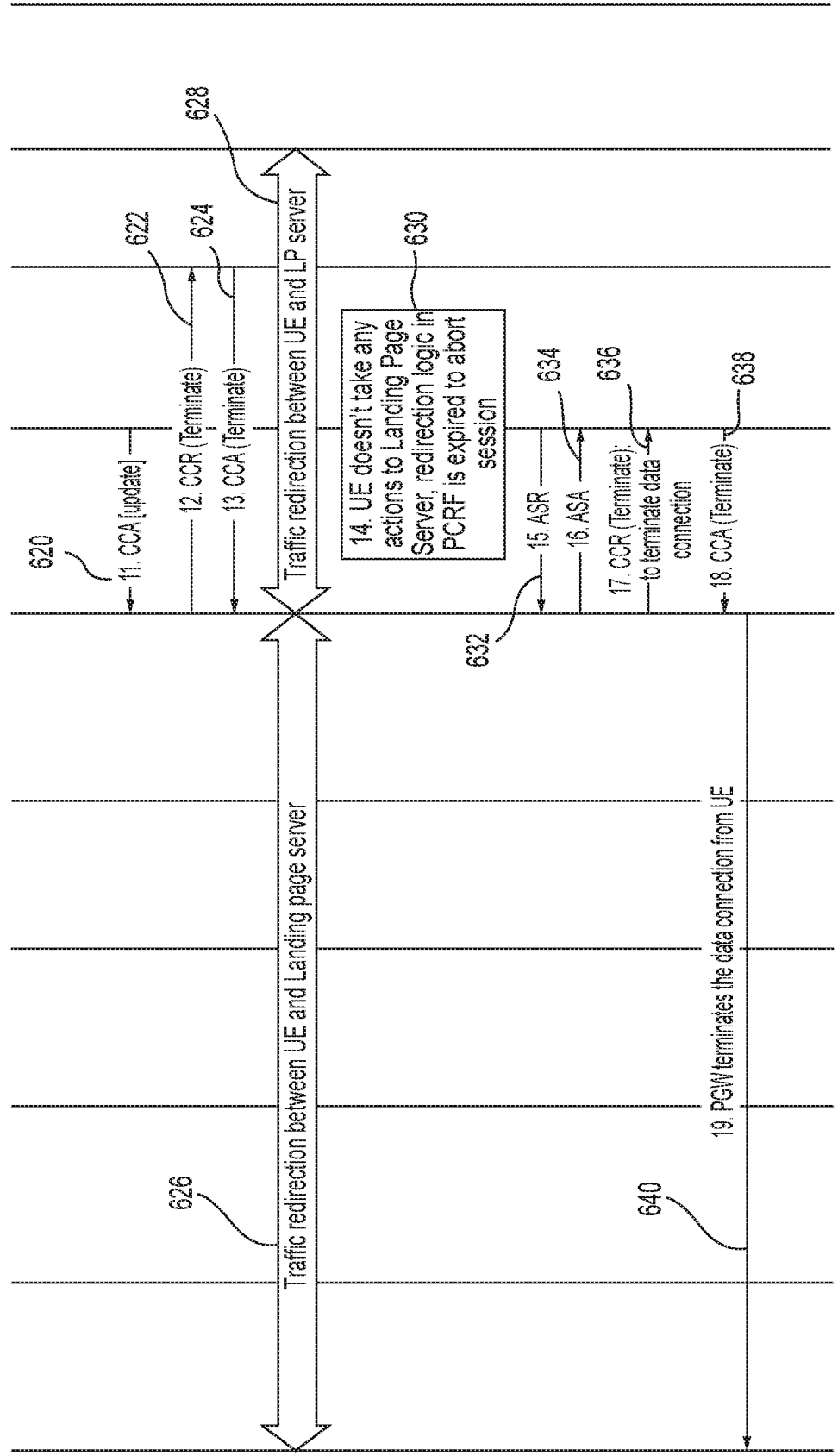
Figure 6C:
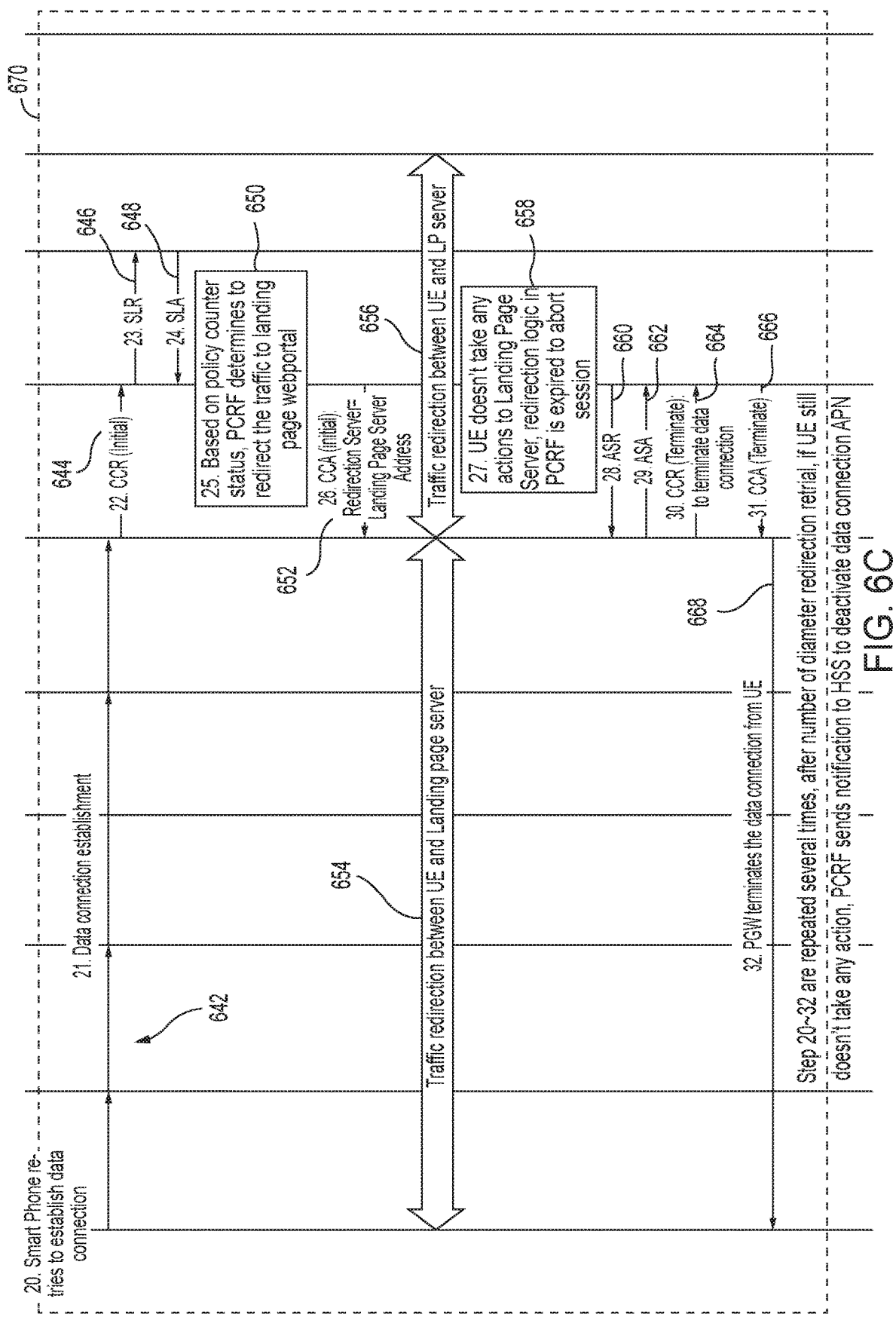
Figure 6D:
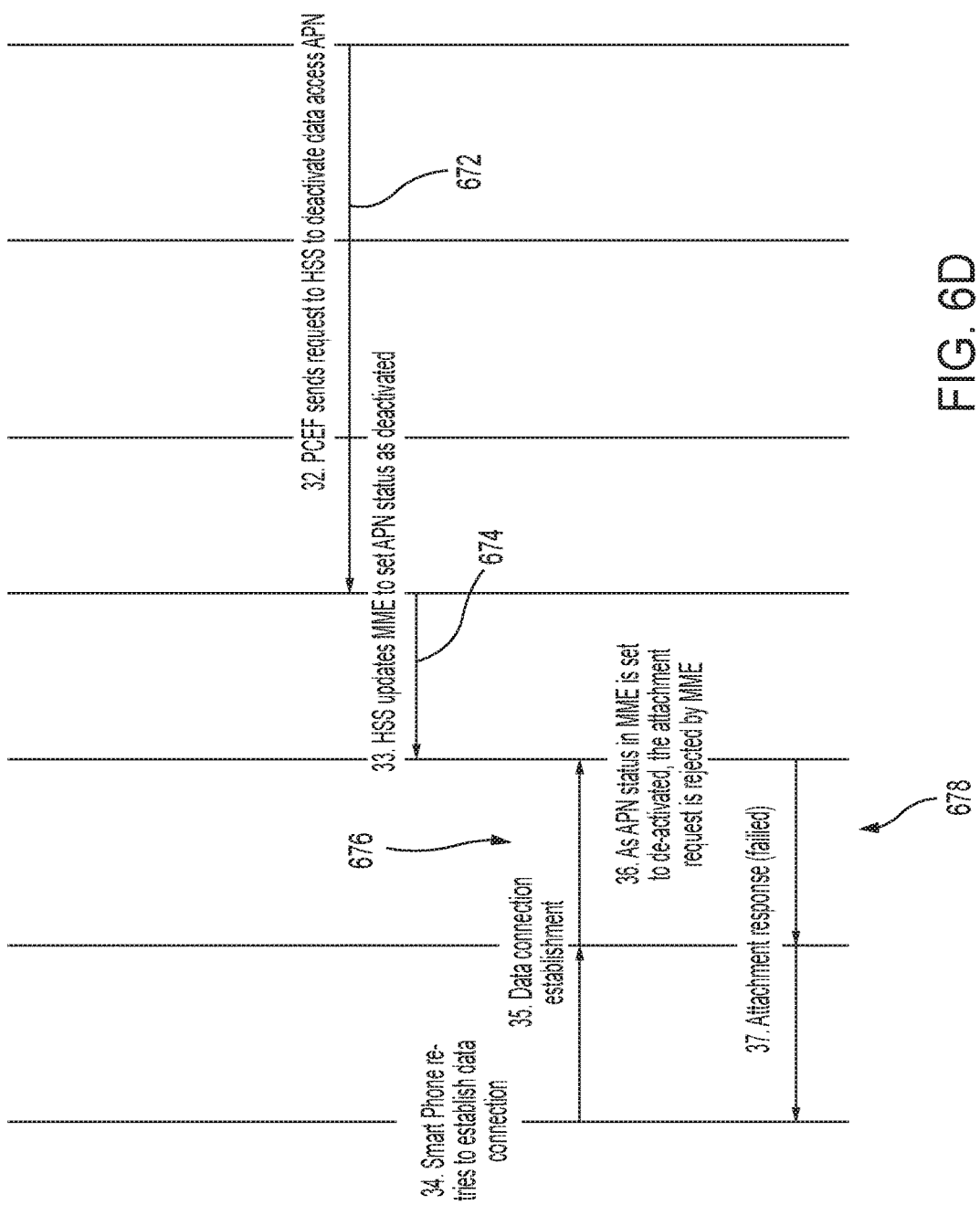

FIG. 5 is a signalling chart illustrating an embodiment. The chart illustrates signalling flow when a data connection of a user terminal is directed to a landing server when a predetermined condition fulfils. The communication system in this example is a 3G or 4G based system.

When the situation begins a data connection 500 between a user terminal 100 and PGW 106 has been established. Next the user terminal 100 initiates 502 a data connection to a server in the Internet 108. PGW enforces 504 policy rules related to the user terminal, i.e. determines if the connection is allowed.

If so, the PGW transmits 506 a Credit Control Request "Initial" (or CCR-I, or CCR-Initial) to the OCS 114 to request quota (such as to request X Mbytes of traffic).

In this example, the OCS determines 508 that the balance of the Access Point Name of the user terminal is used up or the data spending limit is reached and determines to redirect the traffic from the user terminal to a landing page server 118.

In an embodiment, the Landing page server is the web portal. The core network can redirect end user's normal Internet web access to a web portal, which will provide the user some information and prompt the user to perform some actions, or commit some agreement, before the end user is enabled to access normal internet. In this example case, the web portal mat prompt the user to take actions so that the data communication of the user terminal may be restored to a normal state.

The OCS transmits 510 a Credit Control Answer, CCA-I, as a reply to the PGW, the reply comprising information on the redirection and the address of the landing page server.

The data connection 512 of the user terminal is now redirected 514 to the landing page server 108.

In an embodiment, if the user of the user terminal does not take any actions in a given time period, the OCS is configured to abort the session. The OCS transmits 518 an Abort-Session-Request, ASA, to the PGW.

The PGW responds 520 with an Abort-Session-Answer, ASA and transmits 522 a CCR-T to terminate the data connection.

The OCS responds 524 with a CCA-T to acknowledge that OCS received the CCR-T.

Next the PGW informs 526 the user terminal that the data connection is terminated.

In some point of time, the user terminal may try to establish a data connection by sending a request 528 to the PGW.

The PGW transmits 530 a Credit Control Request "Initial", CCR-I, to the OCS 114 to request quota.

The OCS determines 532 that the balance of the Access Point Name of the user terminal is used up or the data spending limit is reached and determines to redirect the traffic from the user terminal to a landing page server 118.

The OCS transmits 534 a CCA-I, as a reply to the PGW, the reply comprising information on the redirection and the address of the landing page server.

The data connection 536 of the user terminal is now again redirected 538 to the landing page server 108.

Again, if the user of the user terminal does not take any actions in a given time period, the OCS is configured to abort the session. The OCS transmits 540 an Abort-Session-Request, ASA, to the PGW.

The PGW responds 542 with an Abort-Session-Answer, ASA and transmits 544 a CCR-T to terminate the data connection.

The OCS responds 546 with a CCA-T to acknowledge that OCS received the CCR-T.

Next the PGW informs 548 the user terminal that the data connection is terminated.

The actions 550 may be repeated several times. After a given number of times if the user still does not take any actions, the OCS may be configured to transmit 552 a request to HSS to deactivate the Access Point Name of the user terminal 100.

The HSS updates 554 the MME on the basis of the request to set the APN status as deactivated.

If the user terminal tries to establish 556 a data connection using the APN, the MME rejects 558 the connection as the APN status is deactivated.

FIGS. 6A-6D are signalling charts illustrating an embodiment. The chart illustrates signalling flow when a data connection of a user terminal is directed by the PCRF 116 to a landing server when a predetermined condition fulfils. The communication system in this example is a 3G or 4G based system.

When the situation begins a data connection 600 between a user terminal 100 and PGW 106 has been established. Next the user terminal 100 initiates 602 a data connection to a server in the Internet 108. PGW enforces 604 policy rules related to the user terminal, i.e. determines if the connection is allowed.

After PGW has consumed up the data quota allocated during PDN session establishment, the PGW transmits 606 a Credit Control Request "Update", CCR-U to the OCS 114 to request quota (such as to request X Mbytes of traffic).

In this example, the OCS determines 608 that the balance of the Access Point Name of the user terminal is used up or the data spending limit is reached and transmits 610 a Credit Control Answer, CCA-U, as a reply to the PGW, the reply comprising information on that a limit has been reached.

Next, the OCS transmits 612 a Spending Notification Request, SNR, to the PCRF indicating a policy status change. The PCRF responds 614 with a Spending-Status Notification Answer, SNA. When PGW receives no quota from OCS in step 610, the PGW will report CCR-U to PCRF with Event-Trigger set to OUT_OF_CREDIT, the PCRF receives 616 a CCR-U from the PGW and determines 618 the new policy rule and redirects the user terminal data connection to a landing page server.

The PGW receives 620 a CCA-U from PCRF and performs traffic redirection, the reply comprising information on the redirection and the address of the landing page server. As no quota is allocated from OCS in step 610/6, PGW will send a CCR-T 622 to OCS to terminate the online charging session. The PCS then respond 624 with a CCA-T to the PGW.

The data connection 626 of the user terminal is now redirected 628 to the landing page server 108.

If the user of the user terminal does not take any actions in a given time period, the PCRF is configured 630 to abort the session. The PCRF transmits 632 an Abort-Session-Request, ASA, to the PGW.

The PGW responds 634 with an Abort-Session-Answer, ASA and transmits 636 a CCR-T to terminate the data connection.

The PCRF responds 638 with a CCA-T to acknowledge that PCRF received the CCR-T.

Next the PGW informs 648 the user terminal that the data connection is terminated.

In some point of time, the user terminal may try to establish a data connection by sending a request 642 to the PGW.

The PGW transmits 644 a Credit Control Request "Initial", CCR-I, to the PCRF 116 to request quota.

The PCRF transmits 646 a Spending-Limit-Request, SLR, to the OCS and receives 648 a Spending-Limit-Answer, SLA, as a reply. Based on policy counter status, the PCRF determines 650 to redirect the traffic again to the Landing Page Server.

The PCRF transmits 652 a CCA-I as reply to the PGW, the reply comprising information on the redirection and the address of the landing page server.

The data connection 654 of the user terminal is now again redirected 656 to the landing page server 108.

Again, if the user of the user terminal does not take any actions in a given time period, the PCRF is configured 658 abort the session. The PCRF transmits 660 an Abort-Session-Request, ASA, to the PGW.

The PGW responds 662 with an Abort-Session-Answer, ASA and transmits 664 a CCR-T to terminate the data connection.

The PCRF responds 666 with a CCA-T to acknowledge that PCRF received the CCR-T.

Next the PGW informs 668 the user terminal that the data connection is terminated.

The actions 670 may be repeated several times. After a given number of times if the user still does not take any actions, the PCRF may be configured to transmit 672 a request to HSS to deactivate the Access Point Name of the user terminal 100.

The HSS updates 674 the MME on the basis of the request to set the APN status as deactivated.

If the user terminal tries to establish 676 a data connection using the APN, the MME rejects 678 the connection as the APN status is deactivated.

Figure 7A:
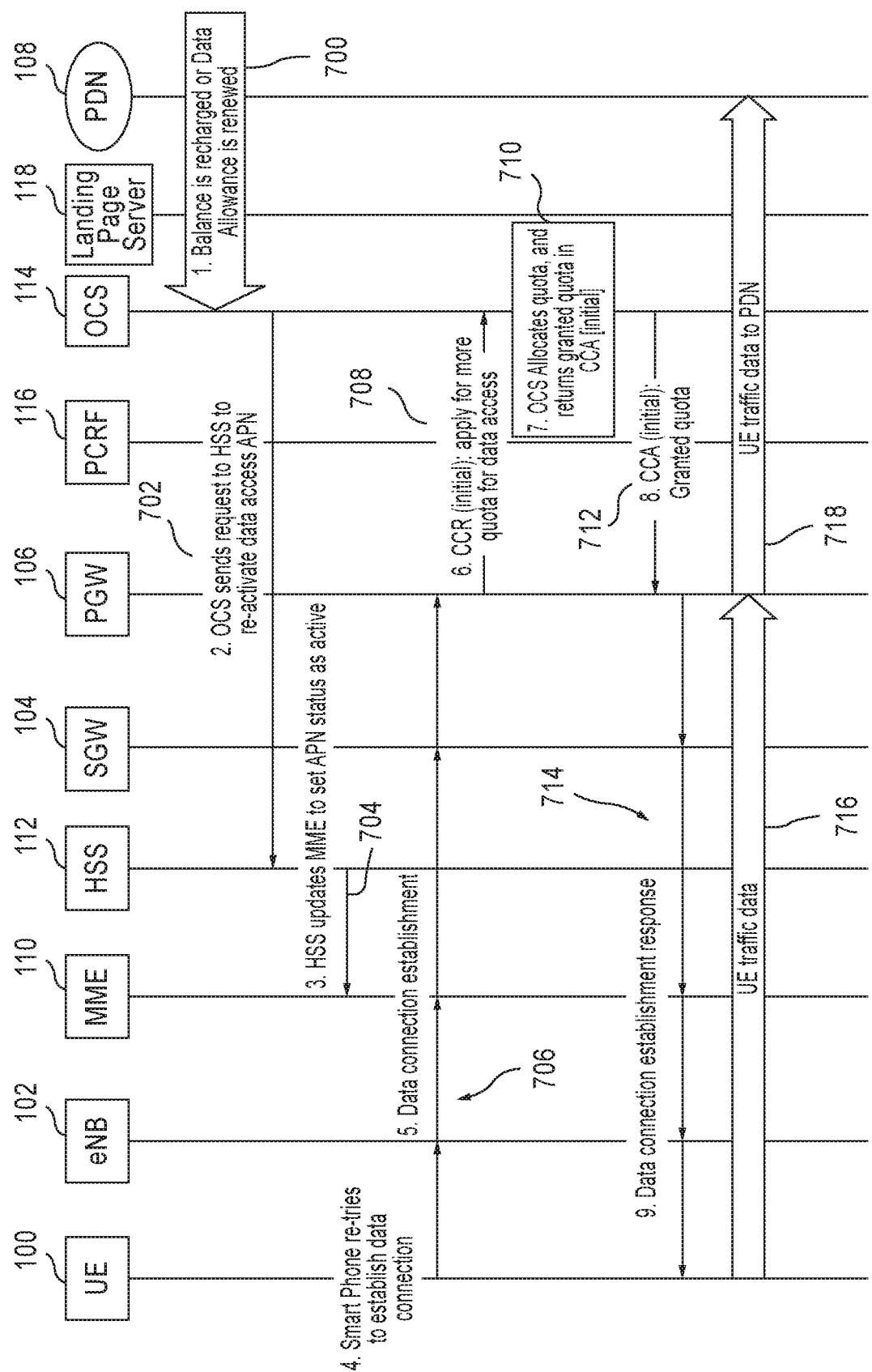

FIG. 7A is a signalling chart illustrating an embodiment. The chart illustrates signalling flow when the end user of a user terminal has recharged the APN which had been de-activated or the data allowance of the APN has been renewed. The communication system in this example is a 3G or 4G based system.

The OCS 114 receives 700 information that the predetermined condition is fulfilled. i.e. the balance is recharged or data allowance renewed, for example.

On the basis of the information, the OCS 114 transmits the HSS 112 a request 702 to re-activate the APN.

The HSS updates 704 the MME 110 to set the APN status as active.

In some point of time, the user terminal may try to establish a data connection by sending a request 706 to the PGW.

The PGW transmits 708 a Credit Control Request "Initial", CCR-I, to the OCS 114 to request quota.

The OCS determines 710 that the balance of the Access Point Name of the user terminal is available, grants quota and transmits 712 a Credit Control Answer CCA "Initial", CCA-I as a reply to the PGW.

As a result, PGW transmits a data connection request response 714 to the user terminal.

The data connection 716, 718 between the user terminal and Internet has been established.

Figure 7B:
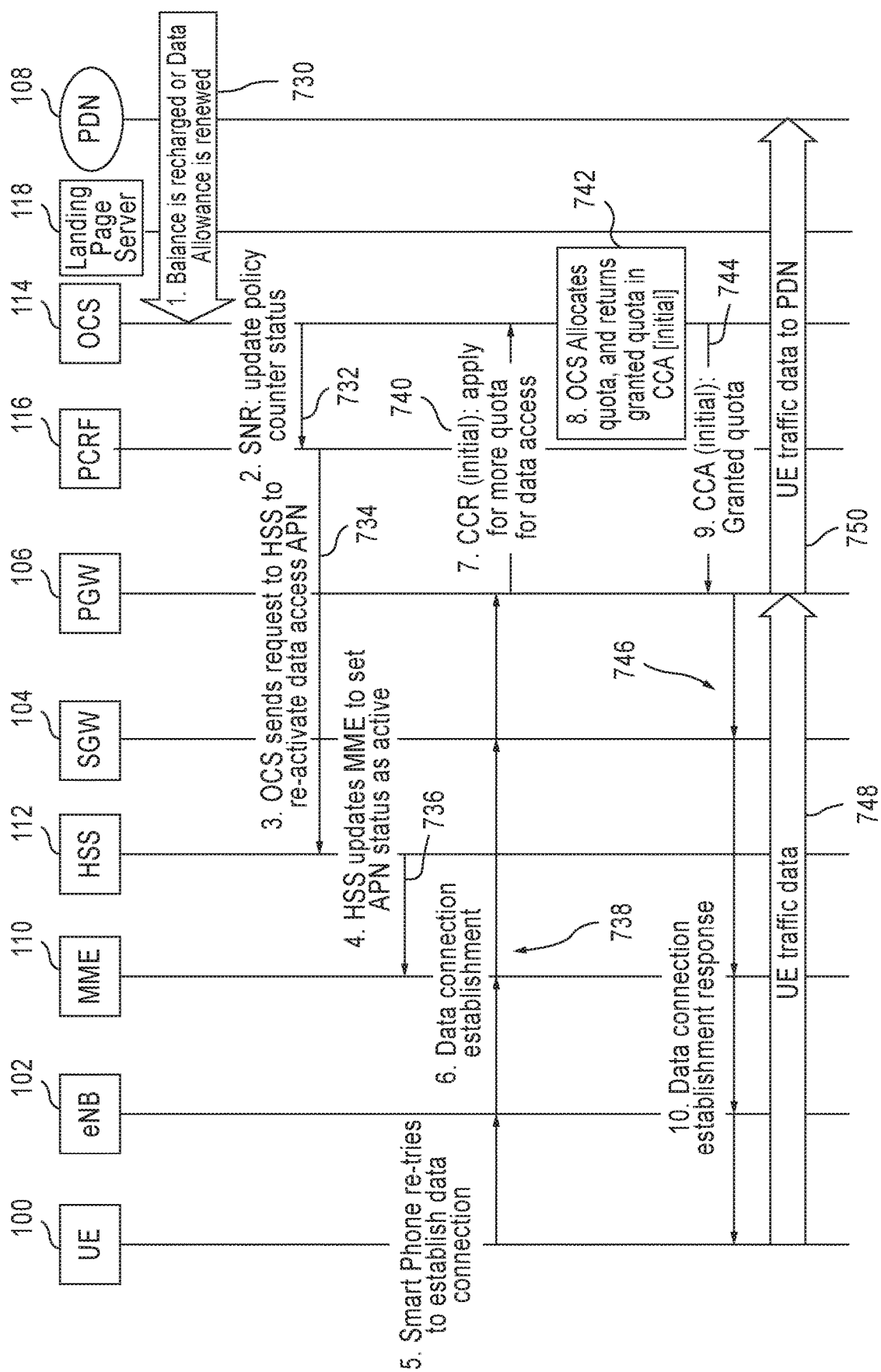

FIG. 7B is a signalling chart illustrating an embodiment. The chart illustrates signalling flow when the end user of a user terminal has recharged the APN which had been de-activated or the data allowance of the APN has been renewed. The communication system in this example is a 3G or 4G based system. Instead of the OCS reactivating the APN as in FIG. 7, here it is the PCRF that reactivates the APN.

The OCS 114 receives 730 information that the predetermined condition is fulfilled. i.e. APN balance is recharged or APN data allowance renewed, for example.

On the basis of the information, the OCS transmits 732 a Spending Status Notification Request, SNR, to the PCRF 116 indicating a policy status change.

On the basis of the request, the PCRF 116 transmits the HSS 112 a request 734 to re-activate the APN.

The HSS updates 736 the MME 110 to set the APN status as active.

In some point of time, the user terminal may try to establish a data connection by sending a request 738 to the PGW.

The PGW transmits 740 a Credit Control Request "Initial", CCR-I, to the OCS 114 to request quota.

The OCS determines 742 that the balance of the Access Point Name of the user terminal is available, grants quota and transmits 744 a Credit Control Answer CCA "Initial", CCA-I as a reply to the PGW.

As a result, PGW transmits a data connection request response 746 to the user terminal.

The data connection 748, 750 between the user terminal and Internet has been established.

Figure 8A:
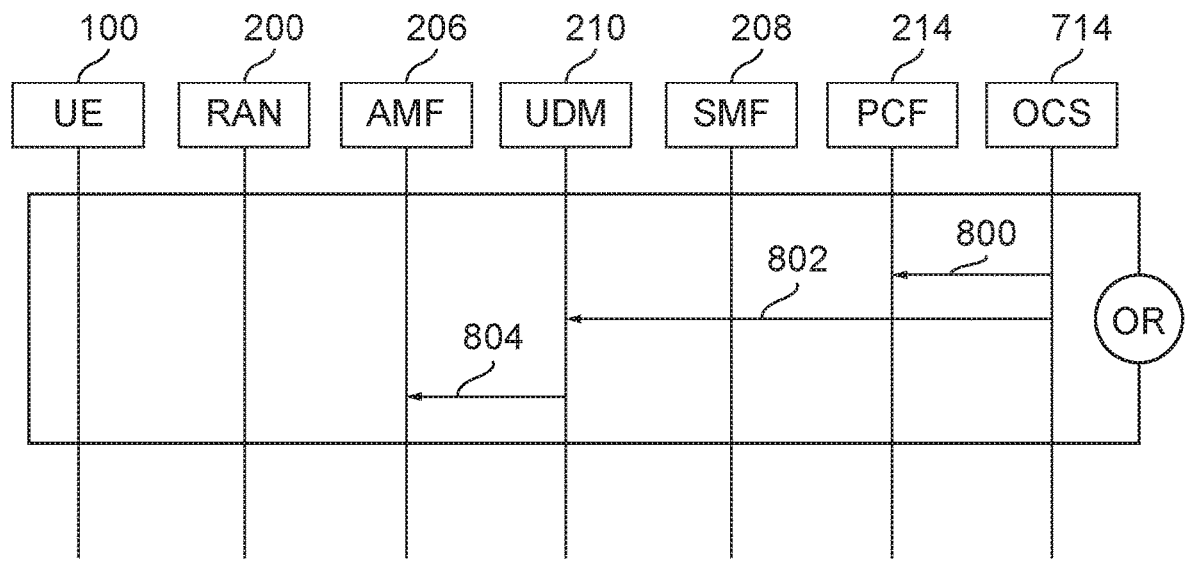

FIG. 8A is a signalling chart illustrating an embodiment. The chart illustrates an example of signalling flow when a data connection of a user terminal is deactivated when a predetermined condition fulfils. The communication system in this example is a 5G based system.

The OCS 114 may send a pcf_PolicyControl_PolicyUpdate message 800 to PCF 214 or the OCS/PCF might send directly the request Nudm_SubscriberDataManagement_Update 802 to UDM 210 to update user's subscription data in the UDM. The purpose of this request will be to deactivation of Data Network Name (DNNs) of network slices/services that are chargeable.

The UDM 210 transmits a Nudm_SubscriberData-Management_UpdateNotification service message 804 to update subscriber data stored in the AMF 206 and deactivate Data Network Name of network slices authorization for the user terminal. As a result, the user terminal cannot establish PDN data connection, so there is no message request to SMF and to policy and charging control system after data allowance is used up.

When the user terminal will at some point of time try to establish a PDN data connection, the AMF is up to date of modified subscription data and authorization which will allow to reject the PDN data connection establishment and save network resources.

Another alternative is that AMF uses Nudm_SubscriberData-Management_Get to retrieve subscription data from UDM.

Figure 8B:
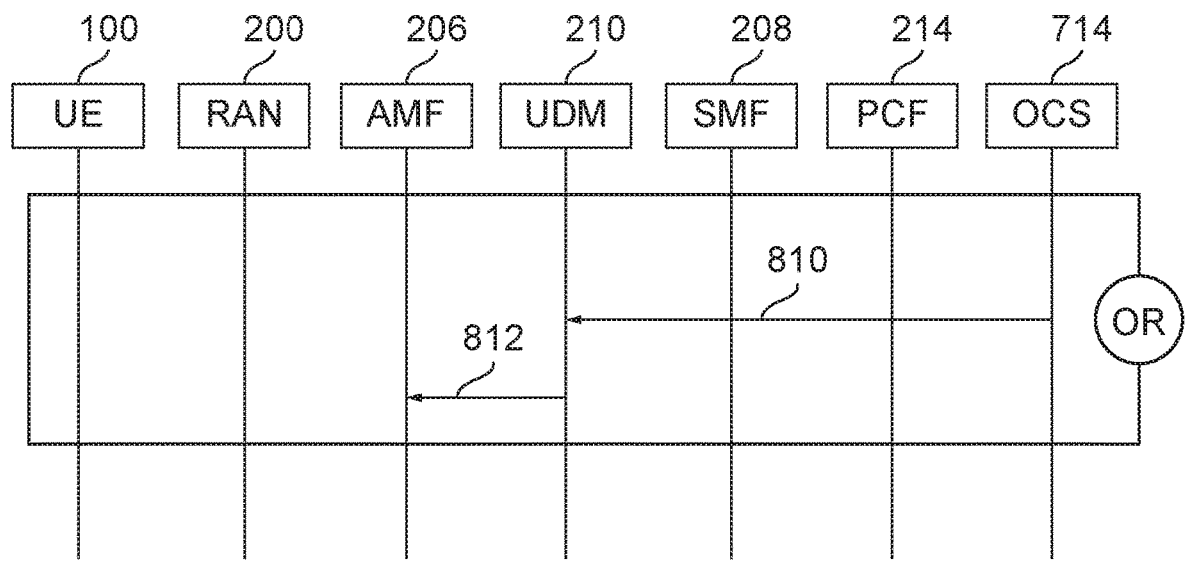

FIG. 8B is a signalling chart illustrating an embodiment. The chart illustrates an example of signalling flow when the end user balance/data allowance is recharged. The communication system in this example is a 5G based system.

When information of the recharge arrives the policy and charging system will trigger another request to UDM to re-activate corresponding Data Network Name of network slices which were deactivated previously using Nudm_SubscriberDataManagement_Update 810. Whenever the user profile is changed for a user in the UDM 210, and the changes affect the user profile in the AMF 206, the UDM notifies these changes to the affected AMF by the means of invoking Nudm_SubscriberDataManagement_UpdateNotification 812 service operation. Then the AMF adds or modifies the user profile. Thus, UDM will update AMF to remove the barring of the data connection. Nudm_SubscriberDataManagement_UpdateNotification service operation can be used by the UDM to update subscriber data stored in the AMF.

Figure 9:
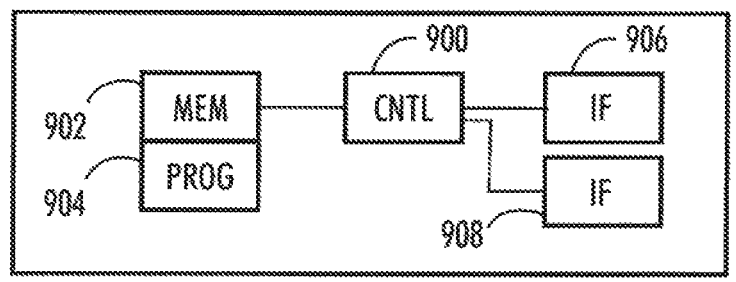
FIG. 9 illustrate a simplified example of an apparatus applying embodiments of the invention.

FIG. 9 illustrates an embodiment. The figure illustrates a simplified example of an apparatus or network element applying embodiments of the invention. In some embodiments, the apparatus may be a network element or a part of a network element.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

In an embodiment, the apparatus is the Online Charging System, OCS 114 of FIG. 1. The apparatus may also be a server in the communication system of FIG. 1 executing actions defined in the independent claims. The apparatus may be realised with distributed computing, i.e. the functions performed by the apparatus may be realised by a multitude of separate apparatuses connected to each other.

The apparatus of the example includes a configured to control at least part of the operation of the apparatus.

The apparatus may comprise a memory 902 for storing data. Furthermore the memory may store software 904 executable by the control circuitry 900. The memory may be integrated in the control circuitry.

The apparatus further comprises one or more interface circuitries 906, 908 configured to connect the apparatus to other devices and network elements of the radio access network. The interface may provide a wired or wireless connection.

In an embodiment, the software 904 may comprise a computer program comprising program code means adapted to cause the control circuitry 902 of the apparatus to realise the embodiments described above.

For example, control circuitry 900 and the software 904 may be configured to determine that a data connection of an access point name of the user terminal does not fulfil a predetermined condition and transmit a message on the basis of determination, the message indicating the access point name of the user terminal is to be deactivated or the data connection of the access point name or data network name is to be directed to a predetermined server.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. A method for controlling communication of a user terminal, the method comprising:
   determining that a data connection of an access point name or data network name of the user terminal does not fulfil a data allowance condition;
   transmitting to a network unit maintaining information on subscriber information of users of the network a message on the basis of determination, the message indicating that the data connection of the access point name or the data network name is to be redirected to a predetermined server;
   after a given number of redirection, responsive to determining that the data connection still does not fulfil the data allowance condition, transmitting a request to deactivate the access point name or the data network name; and
   responsive to determining that the data allowance condition is fulfilled, transmitting to the network unit a message indicating that the previously deactivated access point name or the data network name is to be activated.

2. The method of claim 1, further comprising:
   performing the determination on the basis of an allocation request from a Packet Data Network Gateway.

3. The method of claim 2, further comprising:
   transmitting to the Packet Data Network Gateway, on the basis of the determination, a command to disconnect the data connection.

4. The method of claim 2, wherein the message indicating that the data connection of the access point name of the user terminal is to be directed to a predetermined server is transmitted to the Packet Data Network Gateway.

5. The method of claim 4, further comprising:
receiving information that the data allowance condition is fulfilled;
transmitting a message to the Packet Data Network Gateway indicating that the direction of the data connection of the access point name of the user terminal to the predetermined server is to be released.

6. The method of claim 1, further comprising:
transmitting to a Home Subscriber Server of the user terminal the message indicating that the access point name of the user terminal is to be deactivated.

7. The method of claim 1, further comprising:
receiving information that the predetermined condition is fulfilled; and
transmitting to the network unit the message indicating that the access point name or the data network name is to be activated.

8. The method of claim 1, wherein the message indicating that the access point name or data network name of the user terminal is to be deactivated is transmitted by an Online Charging System or a Policy Charging Control Function.

9. The method of claim 1, further comprising:
transmitting a message to Unified Data Management, of the network that the user terminal is connected to, the message indicating that the network slice services related to charged data connections of the data network name of the user terminal are to be deactivated.

10. The method of claim 1, wherein other access point names or data network names of the user terminal having separate or independent data allowances are to be retained.

11. An apparatus in a radio access network, comprising:
at least one processor; and
at least one memory including computer program code,
the at least one memory and the computer program code configured to, with the at least one processor, cause the apparatus at least to
determine that a data connection of an access point name or data network name of the user terminal does not fulfil a data allowance condition;
transmit to a network unit maintaining information on subscriber information of users of the network a message on the basis of determination, the message indicating that the data connection of the access point name or data network name is to be directed to a predetermined server;
after a given number of redirection, responsive to determining that the data connection still does not fulfil the data allowance condition if the data connection still does not fulfil the data allowance condition, transmit a request to deactivate the access point name or the data network name; and
responsive to determining that the data allowance condition is fulfilled, transmit to the network unit a message indicating that the access point name or the data network name is to be activated.

12. The apparatus of claim 11, the at least one memory and the computer program code configured to, with the at least one processor, cause the apparatus further to:
perform the determination on the basis of an allocation request from a Packet Data Network Gateway.

13. The apparatus of claim 12, the at least one memory and the computer program code configured to, with the at least one processor, cause the apparatus further to:
transmit, to the Packet Data Network Gateway on the basis of the determination, a command to disconnect the data connection.

14. The apparatus of claim 11, the at least one memory and the computer program code configured to, with the at least one processor, cause the apparatus further to:
transmit to a Home Subscriber Server of the user terminal the message indicating that the access point name of the user terminal is to be deactivated.

15. The apparatus of claim 11, the at least one memory and the computer program code configured to, with the at least one processor, cause the apparatus further to:
transmit to the Packet Data Network Gateway the message indicating that the data connection of the access point name of the user terminal is to be directed to a predetermined server.

16. The apparatus of claim 11, the at least one memory and the computer program code configured to, with the at least one processor, cause the apparatus further to:
transmit a message to a Unified Data Management of the network to which the user terminal is connected, the message indicating that the network slice services related to charged data connections of the data network name of the user terminal are to be deactivated.

17. The apparatus of claim 11, wherein the apparatus is an Online Charging System or a Policy Charging Function.

18. A computer program product embodied on a non-transitory computer-readable medium readable by a computer and comprising program instructions which, when loaded into an apparatus, execute a method comprising:
determining that a data connection of an access point name or data network name of the user terminal does not fulfil a data allowance condition;
transmitting to a network unit maintaining information on subscriber information of users of the network a message on the basis of determination, the message indicating that the data connection of the access point name or the data network name is to be directed to a predetermined server;
after a given number of redirection, responsive to determining that the data connection still does not fulfil the data allowance condition if the data connection still does not fulfil the data allowance condition, transmitting a request to deactivate the access point name or the data network name; and
responsive to determining that the data allowance condition is fulfilled, transmitting to the network unit a message indicating that the previously deactivated access point name or the data network name is to be activated.

* * * * *